Nov. 3, 1942.  J. E. SMITH  2,301,085
ELECTRIC HEATING UNIT
Filed April 29, 1938
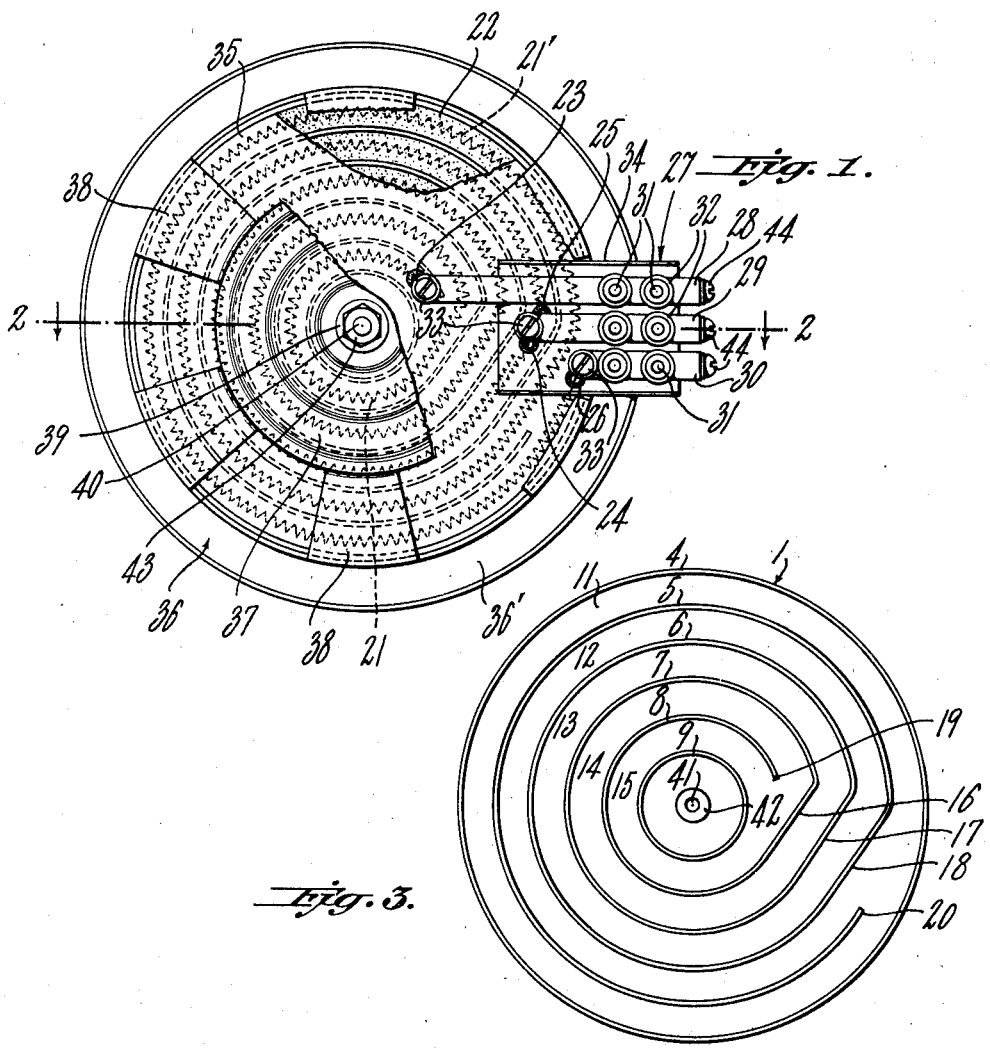
INVENTOR.
JOHN ERNEST SMITH
BY
ATTORNEY.

Patented Nov. 3, 1942

2,301,085

UNITED STATES PATENT OFFICE 2,301,085

ELECTRIC HEATING UNIT

John E. Smith, Plainfield, N. J.

Application April 29, 1938, Serial No. 205,050

2 Claims. (Cl. 219—37)

This invention relates to heating devices and more particularly to those of the type known as hot plates, the principal object being to provide a construction wherein the heat distribution from an electrical heating element beneath the heating area of the plate is such as to eliminate cold spots, and thereby insures the plate surface remaining perfectly flat under all temperature variations within its heating range, whereby efficient heat transfer is obtained between the surface of the plate and the flat bottom of a vessel which may be placed on the plate. A large area of heating surface is therefore in contact with the object to be heated, and the absence of substantial air spaces between the two surfaces contributes to rapid transfer of heat. According to my invention the heating element brings the heating surface of the plate quickly to a uniform temperature free of distortion and warping, thereby insuring flatness of the plate at all operating temperatures.

Another object is to provide means for tapping the heating element at various points to localize the effective heating area in the plate surface, or for making a number of different combination connections to the source of current, for the purpose of obtaining various degrees of heat in the surface of the plate.

Another object is to provide a hot plate and terminal means connected to tapping points of the heating element, in the form of a unit requiring no wiring to be done except the necessary service lines to the terminal means carried by the plate.

Various other objects and advantages of the invention will appear as the description proceeds, reference being made to the accompanying drawing forming a part of this specification, and in which:

Fig. 1 is a bottom plan view of a hot plate and terminal means for tapping the heating element according to my invention, parts being broken away to show the construction, Fig. 2 a transverse section on the line 2—2 of Fig. 1 looking in the direction of the arrows, and Fig. 3 a bottom plan view of the hot plate showing channels for the heating element.

In the drawing the reference numeral 1 indicates a hot plate structure which may be of cast metal such as iron, having a smooth flat heating surface 2. The plate 1 preferably is of circular contour and is characterized by a series of depending thin ribs or walls 4, 5, 6, 7, 8 and 9 which form concentric channels 11, 12, 13, 14 and 15 interconnected by wall sections 16, 17 and 18, whereby a continuous wall is formed from the inner end 19 to the outer end 20, and there is provided a series of interconnected concentric channels in the bottom of the plate.

A pair of electric heating elements 21 and 21' are embedded in suitable heat resisting insulating material 22 and extends around channels as indicated in Figures 1 and 2. The inner or central heating element 21 of the pair has one terminal point at 23 adjacent the center of the plate, and the other terminal at 24 which is about midway of the channel circuit. The outer heating element 21' has one terminal at 25 and the other at 26. These elements may be considered as a single element with an intermediate tapping point.

For making electrical connections from the service current to the heating elements 21 and 21' there is provided a terminal support 27 having rigidly secured thereto the terminal bars 28, 29 and 30, as by rivets 31, there being suitable insulation such as 32 to prevent electrical contact between the terminal bars and the support 27. The support 27 may be in the form of a plate having its sides turned downward as indicated at 34 to afford rigidity.

Each of the bars 28, 29 and 30 carry at one end a screw or other suitable fastener 33 for making connections to the ends of the heating elements 21 and 21'. As illustrated in Figure 1 the terminal 23 is secured by the screw 33 to the bar 28, the terminals 24, and 25 to the common bar 29, and the terminal 26 to the bar 30.

A cover plate 35 serves to enclose the insulating material 22 of the heating elements 21 and 21', and is provided with appropriate openings and insulating beads for the terminal wires of the heating elements. The support 27 may be spot welded to the cover plate 35.

The hot plate assembly with its terminal support and conducting bars may be mounted in a framework 36 comprising a ringlike portion 36' encircling the peripheral wall of the hot plate 1, and having a central web portion 37 connected to the ringlike portion 36' by radial arms 38. The framework 36 and the cover plate 35 are fastened to the hot plate 1 by a single fastening means comprising a stud 40 threaded into an opening 41 of a lug 42, a washer 39 and a nut 43 at the outside of the web portion 37, a spacer 43' being provided between the cover plate 35 and the inner face of the web portion 37, whereby the parts are securely held together by the central stud 40, contributing to ease of assembly and simplicity of construction.

The outer ends of the conductor bars 28, 29, and 30 are provided with terminal screws 44 for making electrical connections through suitable switching means (not shown) to the service lines. Such switching means may be of any appropriate type for connecting the two heating elements 21 and 21' singly, in series, or in multiple to the service current, whereby a portion of the plate may be heated, or the whole plate heated to different degres. As for example, current applied to the bars 28 and 29 will energize the inner heating element 21, whereas current applied to the bars 29 and 30 will energize the outer heating element 21'. Similarly, if current is switched through bars 28 and 30 the heating elements 21 and 21' will be connected in series, and if switched to bars 28 and 30 with a common return through bar 29 the two heating elements will be connected in multiple.

It has been demonstrated in actual service that the heating surface of a hot plate embodying the above noted construction is free from distortion at all temperatures, and consequently capable of transferring its heat more rapidly and efficiently to the bottom of a vessel or other flat surfaced object resting on the surface of the plate.

This desirable result is mainly due to the distribution of the heating elements 21, and 21' which extend in the grooves concentrically around the plate beneath the heating surface. Being thus uniformly and concentrically arranged the heating elements bring all radial portions of the heating surface of the plate to a uniform temperature resulting in equal expansion in all portions of the metal, and consequent uniform readjustment of the heated metal to maintain the heating surface in a flat condition. The plate being flat when cold, remains flat when heated. Furthermore, all of the features contributing to rapid heat transfer have the advantage of enabling the resistance wire of the heating elements to be operated at lower temperatures than heretofore, so that the heating elements have longer life.

It is to be understood in conclusion that the invention may be incorporated in various other ways and the construction modified without departing from the principle set forth in the description, and as covered by the appended claims.

I claim:

1. An electric hot plate having a flat heating surface, interconnected concentric channels in the plate beneath the heating surface, electric heating elements in the channels, a cover plate for the bottom of the hot plate, a framework surrounding the peripheral margin of the hot plate and having a portion extending beneath said plate, a terminal support extending outwardly between said cover plate and framework and a single fastening means for holding the cover plate and the framework with the projecting support to the hot plate.

2. An electric hot plate heating unit comprising a thin shell providing a flat top, a downwardly extending peripheral flange, a series of interconnected grooves which are concentric with said flange over a major part of the unit and extend to the center of said unit, each of said grooves having a tangentially projecting portion of sufficient extent to connect each groove with the next adjacent groove, a ceramic embedded resistance heating element filling said grooves and extending around said flange, a plurality of terminals connected to said heating element and extending adjacent each other from one side of said heating unit, said terminals being mounted across the tangential connecting portions, and a bottom pan mounted beneath the heating unit and fastened thereto by a center stud engaging said shell.

JOHN E. SMITH.